_United States Patent Office_

3,030,265
Patented Apr. 17, 1962

3,030,265
BUTYNYL PHOSPHATES
Joseph W. Baker and John P. Chupp, Kirkwood, Mo., assignors to Monsanto Chemical Company, St. Louis, Mo., a corporation of Delaware
No Drawing. Filed Nov. 9, 1959, Ser. No. 851,501
15 Claims. (Cl. 167—22)

This invention relates to new organic phosphorus compounds and to insecticidal formulations comprising such compounds. More particularly, the invention is concerned with those phosphorus compounds which are derived from the interaction of a metal or ammonium salt and a halogenated butynyl salt of phosphoric acid.

It is an object of this invention to provide new and useful compounds of phosphorus. It is a further object of this invention to provide a new class of highly useful insecticides. Still a further object is to provide new and useful formulations comprising such insecticides.

The compounds of the present invention are phosphorus derivatives of the general formula:

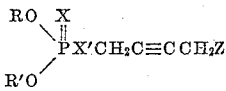

wherein R and R' represent like or unlike lower alkyl radicals or alkoxy substituted lower alkyl radicals, and X and X' are oxygen or sulfur. As employed herein, the term "lower" connotes radicals having from 1 to about 4 carbon atoms. In said general formula, Z represents a radical selected from cyano (—CN), thiocyano (—SCN), alkoxy (—OR″), sulfide (—SR″), mono or dithiocarbamate

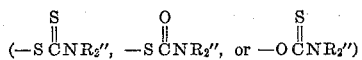

xanthate

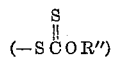

benzothiazo

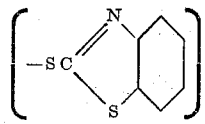

phthalimido, succinimido and saccharinyl wherein R″ is an acyclic radical containing from 1 to about 8 carbon atoms or a phenyl radical. As employed in this application, the term "saccharinyl" designates the radical derived from saccharin by removal of the hydrogen from the nitrogen atom.

Exemplary of the radicals represented by R″ are the alkyls such as methyl, ethyl, n-propyl, isopropyl, n-butyl, tertiary butyl, isoamyl, n-hexyl, 2-methyl-1-pentyl, n-heptyl, 3-ethyl-2-pentyl, n-octyl, 2-ethylhexyl, etc.; the alkenyls and alkynyls such as vinyl, allyl, n-butenyl-2, diisobutenyl, propynyl, 2-butynyl, 3-hexynyl, etc.; other acyclics such as methoxyethyl, ethoxyethyl, 2-chloroethyl, 2-chloroallyl, benzyl, etc.; and phenyl radicals such as phenyl, xenyl, tolyl, chlorophenyl, nitrophenyl, cyanophenyl, methoxyphenyl, etc.

Included within the above general structural formula is a preferred group of compounds which have the formula:

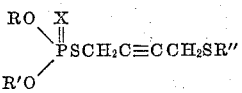

where R and R' are like or unlike lower alkyl radicals, and X and R″ have the same meaning as above. Such compounds display an optimum degree of biocidal activity against a wide variety of pests.

The new compounds of this invention may be readily prepared by reacting a metal or ammonium salt containing the desired Z radical with the reaction product of a dihalogenated butyne and a salt of a phosphoric acid. The proportions of the reactants will vary in accordance with the particular product to be obtained. The reaction of the Z radical salt, the butyne and the acid salt may also be carried out in situ.

This invention will be more fully understood by reference to the following examples. These examples, however, are given for the purpose of illustration only and are not to be construed as limiting the scope of the present invention in any way.

EXAMPLE I

O,O-Diethyl S-(4-Thiocyanato-2-Butynyl) Phosphorothiolate

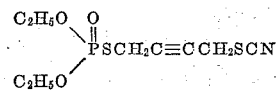

A suitable reactor was charged with 7.6 grams (0.10 mole) of ammonium thiocyanate dissolved in 100 ml. of acetone. There was added 20.0 grams (0.078 mole) of S-(4-chloro-2-butynyl) O,O-diethyl phosphorothiolate with stirring. The mixture was heated at refluxing temperature for 4 hours, after which it was cooled and filtered. The filtrate was stripped of acetone under vacuum and water was added. There was then added 100 ml. of methylene chloride, and an aqueous layer separated. The non-aqueous layer was washed with water and then stripped under vacuum to 100° C. at 10 mm. pressure to remove the methylene chloride. A yield of 15.3 grams (70.5% of theory) of O,O-diethyl S-(4-thiocyanato-2-butynyl) phosphorothiolate was obtained. Analysis showed 10.6% phosphorus and 22.1% sulfur as compared with calculated values of 11.1% phosphorus and 22.9% sulfur.

When 23.4 grams (0.078 mole) of S-(4-chloro-2-butynyl) O,O-dimethoxyethyl phosphorothiolate is substituted for the phosphorothiolate in the above charge, there is obtained O,O-dimethoxyethyl S-(4-thiocyanato-2-butynyl) phosphorothiolate in good yield.

EXAMPLE II 4-(Diethoxyphosphinothioylthio)-2-Butynyl Diethyldithiocarbamate

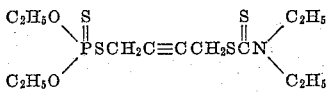

A suitable reactor was charged with 9.12 grams (0.125 mole) of diethylamine and 70 ml. of acetone. There was added 4.56 grams (0.06 mole) of carbon disulfide at 5–25° C. The mixture was stirred for one hour at 25–30° C., after which 15.0 grams (0.058 mole) of S-(4-chloro-2-butynyl) O,O-diethyl phosphorodithioate was added. After heating for 5 hours at 65–70° C., the resultant mixture was cooled and filtered. The filtrate was stripped of acetone, and diethyl ether was added. After washing with water and stripping to 75° C. at 5 mm. of pressure, a yield of 17.8 grams of 4-(diethoxyphosphinothioylthio)-2-butynyl diethyldithiocarbamate was obtained

EXAMPLE III

O,O-Diethyl S-(4-n-Pentylthio)-2-Butynyl Phosphorodithioate

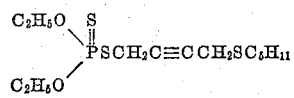

A suitable reactor was charged with 12.3 grams (0.1 mole) of 1,4-dichlorobutyne-2 and 20.3 grams (0.1 mole) of ammonium O,O-diethyl phosphorodithioate in 200 ml. of acetone. After heating at refluxing temperature for 2 hours, the mixture was cooled, and there was added 5.3 grams (0.05 mole) of sodium carbonate followed by 10.4 grams (0.1 mole) of amyl mercaptan. The resultant mixture was heated at refluxing temperature for 14 hours after which it was stripped of acetone. The residue was extracted with methylene chloride and washed with water. The remaining solution was stripped to 80° C. at 3 mm. pressure to yield 23.2 grams (68% of theory) of O,O-diethyl S-(4-n-pentylthio)-2-butynyl phosphorodithioate as an amber liquid.

EXAMPLE IV

*O,O-Diethyl S-(4-Thiocyanato-2-Butynyl) Phosphorodithioate*

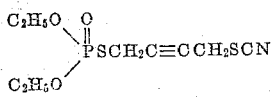

A suitable reactor was charged with dichloride and ammonium salt as in Example III. After cooling, 8.1 grams (0.1 mole) of sodium thiocyanate was added, and the resultant mixture was heated at refluxing temperature for 15 hours. The reaction product was stripped of acetone, extracted with methylene chloride, and then stripped again to 98° C. at 10 mm. of pressure. There was obtained 16.3 grams of O,O-diethyl S-(4-thiocyanato-2-butynyl) phosphorodithioate.

EXAMPLE V

*O,O-Diethyl S-(p-Chlorophenyl)Thio-2-Butynyl Phosphorothiolate*

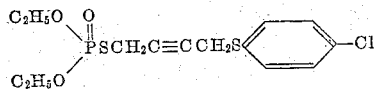

A suitable reactor was charged with 18.7 grams (0.1 mole) of ammonium O,O-diethyl phosphorothioate in 200 ml. of acetone and 12.3 grams (0.1 mole) of 1,4-dichlorobutyne-2. After heating at refluxing temperature for 2 hours, the mixture was cooled, and 6.2 grams (0.06 mole) of sodium carbonate was added followed immediately by 14.7 grams (0.1 mole) of p-chlorothiophenol. The resultant mixture was heated at refluxing temperature for 13 hours after which the acetone was stripped off. The residue was extracted with methylene chloride, and the organic extract was washed with water and stripped to 120° C. at 5 mm. of pressure. A yield of 30.7 grams (84% of theory) of O,O-diethyl S-(p-chlorophenyl)thio-2-butynyl phosphorothiolate was obtained.

When 20.3 grams (0.1 mole) of ammonium O,O-diethyl phosphorodithioate was substituted for the phosphorothioate, a yield of 36.8 grams (97% of theory) of O,O-diethyl S-(p-chlorophenyl)thio-2-butynyl phosphorodithioate was obtained.

EXAMPLE VI

*O,O-Diethyl S-(4-n-Pentylthio)-2-Butynyl Phosphorothiolate*

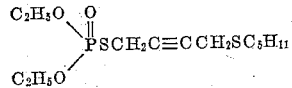

In the procedure of Example IV, 15.6 grams (0.15 mole) of amyl mercaptan was substituted for the chlorothiophenol, and the second reflux heating was continued for an additional hour. The yield was 32.0 grams (100% of theory) of O,O-diethyl S-(4-n-pentylthio)-2-butynyl phosphorothiolate.

When 12.2 grams (0.15 mole) of thiophenol was substituted for the mercaptan, a yield of 25 grams (72% of theory) of O,O-diethyl S-(4-phenylthio)-2-butynyl phosphorothiolate was obtained.

EXAMPLE VII

*O,O-Diethyl S-(4-Benzothiazolethio)-2-Butynyl Phosphorodithioate*

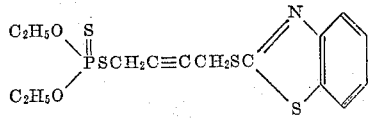

A suitable reactor was charged with 20.3 grams (0.1 mole) of ammonium O,O-diethyl phosphorodithioate in 200 ml. of acetone and 12.3 grams (0.1 mole) of 1,4-dichlorobutyne-2. The mixture was heated at refluxing temperature for 2 hours and was then cooled. There was added 16.7 grams (0.1 mole) of mercaptobenzothiazole followed by 6.2 grams (0.06 mole) of sodium carbonate. This latter mixture was heated at refluxing temperature for 20 hours after which the solids were filtered out, and the filtrate was stripped of acetone. The residue was extracted with methylene chloride, and the organic solution was washed with water and stripped to 120° C. at 5 mm. of pressure. There was obtained 26.0 grams (65% of theory) of O,O-diethyl S-(4-benzothiazolethio)-2-butynyl phosphorodithioate as an amber liquid.

When the mercaptan is 20.2 grams (0.1 mole) of 6-chloromercaptobenzothiazole, and the second reflux heating is shortened to 10 hours, the yield is 28 grams (92% of theory) of the 6-chloro derivative of the phosphorodithioate.

In order to obtain O,O-diethyl S-(4-benzothiazolethio)-2-butynyl phosphorothiolate, 18.7 grams (0.1 mole) of ammonium O,O-diethyl phosphorothioate was substituted for the dithioate in the charge. The yield was 21.3 grams as an amber liquid.

EXAMPLE VIII

*O,O-Diethyl S-(4-Allylthio)-2-Butynyl Phosphorothiolate*

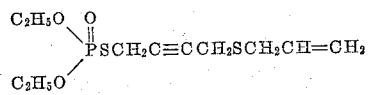

A suitable reactor was charged with 3.7 grams (0.05 mole) of allyl mercaptan in 100 ml. of ethanol and placed under a nitrogen atmosphere. There was slowly added 2.7 grams (0.05 mole) of sodium methylate. This mixture was stirred at room temperature for 1 hour, after which 12.8 grams (0.05 mole) of S-(4-chloro-2-butynyl) O,O-diethyl phosphorothiolate was added. The resultant mixture was heated at refluxing temperature for 3 hours, the alcohol then being removed under vacuum. The residue was extracted with methylene chloride, washed with dilute sodium carbonate solution and water, and finally stripped to 110° C. at 1 mm. of pressure. There was obtained 10.2 grams (71% of theory) of O,O-diethyl S-(4-allylthio)-2-butynyl phosphorothiolate.

When 13.6 grams (0.05 mole) of S-(4-chloro-2-butynyl) O,O-diethyl phosphorodithioate was substituted for the phosphorothiolate, a yield of 7.1 grams of O,O-diethyl S-(4-allylthio)-2-butynyl phosphorodithioate was obtained as an amber liquid.

EXAMPLE IX

*O,O-Diethyl S-(4-Ethylthio)-2-Butynyl Phosphorothiolate*

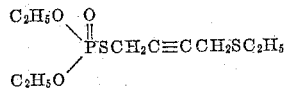

Following the procedure of Example VIII, 3.1 grams (0.05 mole) of ethyl mercaptan was substituted for the allyl mercaptan. The yield was 10.4 grams (75% of theory) of O,O-diethyl S-(4-ethylthio)-2-butynyl phosphorothiolate. Analysis showed 10.2% phosphorus and 23.2% sulfur as opposed to calculated values of 11.2% phosphorus and 23.0% sulfur.

In the same manner, using 13.6 grams (0.05 mole) of S-(4-chloro-2-butynyl) O,O-diethyl phosphorodithioate instead of the phosphorothiolate, a yield of 4.0 grams of O,O-diethyl S-(4-ethylthio)-2-butynyl phosphorodithioate was obtained as an amber liquid.

EXAMPLE X

*O,O-Diisopropyl S-(4-Ethylthio)-2-Butynyl Phosphorothiolate*

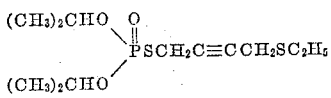

Again following the procedure of Example VII, the reactants were 2.5 grams (0.04 mole) of ethyl mercaptan, 100 ml. of ethanol, 2.2 grams (0.04 mole) of sodium methylate, and 11.4 grams (0.04 mole) of S-(4-chloro-2-butynyl) O,O-diisopropyl phosphorothiolate. Heating at refluxing temperature was carried out for 4 hours, and the final stripping was to 120° C. at 1 mm. of pressure. A yield of 9.4 grams (76% of theory) of O,O-diisopropyl S-(4-ethylthio)-2-butynyl phosphorothiate was obtained.

EXAMPLE XI

*O,O-Diethyl S-(4-Cyano-2-Butynyl) Phosphorodithioate*

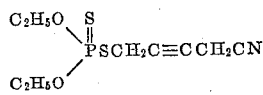

A suitable reactor was charged with 2.5 grams (0.05 mole) of sodium cyanate, 13.6 grams (0.05 mole) of S-(4-chloro-2-butynyl) O,O-diethyl phosphorodithioate, and 100 ml. of acetone. The mixture is heated at refluxing temperature for a period of 8 hours, and worked up in the manner of Example IV to yield O,O-diethyl S-(4-cyano-2-butynyl) phosphorodithioate.

EXAMPLE XII

*O,O-Diethyl S-[4-(3-Oxo-1,2-Benzisothiazolin-2-yl)-2-Butynyl] Phosphorothiolate, Dioxide*

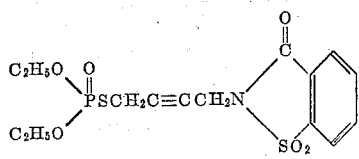

A suitable reactor was charged with 12.9 grams (0.05 mole) of S-(4-chloro-2-butynyl) O,O-diethyl phosphorothiolate, 10.2 grams (0.05 mole) of sodium saccharin and 100 ml. of acetone. The mixture was heated at refluxing temperature for 12 hours, followed by cooling and filtration. The filtrate was stripped of acetone. The residue was then extracted with methylene chloride, washed with water, and stripped to 110° C. at 1 mm. of pressure. There was obtained 11.0 grams (61% of theory) of O,O-diethyl S-[4-(3-oxo-1,2-benzisothiazolin-2-yl)-2-butynyl] phosphorothiolate, dioxide.

EXAMPLE XIII

*O,O-Diethyl S-(4-Methoxy-2-Butynyl) Phosphorodithioate*

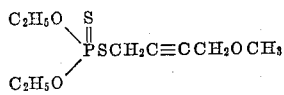

A suitable reactor was charged with 11.0 grams (0.04 mole) of S-(4-chloro-2-butynyl) O,O-diethyl phosphorodithioate, 2.2 grams (0.04 mole) of sodium methylate, and 100 ml. of methanol. The mixture was heated at refluxing temperature for 3 hours, after which it was filtered. The filtrate was stripped of solvent, and the residue was extracted with methylene chloride and washed with water. Stripping to 100° C. at 1 mm. of pressure yielded 7.4 grams (69% of theory) of O,O-diethyl S-(4-methoxy-2-butynyl) phosphorodithioate.

EXAMPLE XIV

*O,O-Diisopropyl S-(4-Ethoxythiocarbonylthio-2-Butynyl) Phosphorothiolate*

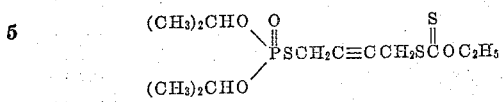

A suitable reactor was charged with 28.5 grams (0.1 mole) of S-(4-chloro-2-butynyl) O,O-diisopropyl phosphorothiolate in 200 ml. of acetone, and 16.0 grams (0.1 mole) of solid potassium ethylxanthate. The mixture was heated at refluxing temperature for 12 hours and was then cooled and filtered. The filtrate was stripped of acetone, and the residue was extracted with methylene chloride. The extract was washed with water and stripped to 110° C. at 1 mm. of pressure There was obtained O,O-diisopropyl S-(4-ethoxythiocarbonylthio-2-butynyl) phosphorothiolate as an amber liquid.

EXAMPLE XV

*N-(4-Diethoxyphosphinothioylthio-2-Butynyl) Phthalimide*

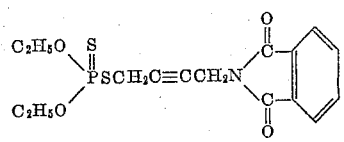

A suitable reactor was charged with 10.9 grams (0.04 mole) of S-(4-chloro-2-butynyl) O,O-diethyl phosphorodithioate, 7.4 grams (0.04 mole) of potassium phthalimide, and 150 ml. of acetone. After heating this mixture at refluxing temperature for 8 hours, it was cooled and filtered. The filtrate was stripped of solvent. The residue was extracted with methylene chloride, washed with water, and stripped to 80° C. at 1 mm. of pressure. A yield of 7.5 grams of N-(4-diethoxyphosphinothioylthio-2-butynyl) phthalimide was obtained as a dark viscous oil.

The specific activity of some of the individual compounds disclosed herein is enumerated below. At the outset it should be made clear that such data is merely exemplary, and that similar results are obtained by employing any of the other compounds within the scope of this invention. Tests of systemic activity were made by immersing the excised stems of bean plants in diluted emulsions of the compounds for three days. Leaves were then excised, infested with the selected pest, and the percent kill was noted after 48 hours. Tested against the two-spotted spider mite, emulsions containing 100 p.p.m. of the first compound of Example V or the first compound of Example VI killed 100% of the test organisms. A kill of 90% was achieved using the third compound of Example VII. Systemic tests against the bean beetle showed 100% kill at a concentration of 0.004% of the first compound of Example I and 60% kill at 0.004% of the first compound of Example VI.

The insecticidal effectiveness of the new compounds was also demonstrated in contact tests on the mobile and resting stages, as well as on the ova, of the two-spotted spider mite. Concentrations of 0.1% resulted in 100% kill using any of the following: the first compound of Example I; the compound of Example IV; either compound of Example V; the first compound of Example VI; and either of the first and third compounds of Example VII. Further, at concentrations of 0.05% either compound of Example V still gave 100% kill against the mobile stage.

Using the compounds of this invention against yellow fever mosquito larvae, concentrations of 0.001% of the active ingredient gave 100% kill with any one of the compounds of Examples II through V. At 0.0003%, 100% kill resulted by using the first compound of Example VI, while the first compound of Example I gave 100% kill even with the concentration reduced to 0.00002%. The first compound of Example I was also tested for residual action on filter paper. Against the red flour beetle, kills of 100% and 90% were obtained with concentrations of 1.0% and 0.5% respectively.

It will be understood that the terms "insect" and "insecticide" are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection h, wherein the term "insect" is used to refer not only to those small invertebrate animals belonging mostly to the class Insecta, comprising six-legged, usually winged forms, as beetles, bugs, bees, flies, and so forth, but also to their allied classes of arthropods whose members are wingless and usually have more than six legs, as spiders, mites, ticks, centipedes, and wood lice.

For maximum effectiveness the active ingredients of the present invention are admixed in insecticidally effective amount with an insecticidal adjuvant. In order to provide formulations particularly adapted for ready and efficient application to insects using conventional equipment, such formulations comprise those of both the liquid and solid types as well as the "Aerosol" type formulations. Application may be directly to the insects, to the plant hosts of such insects, to soil or other media used for growing plants. In the pure state the active ingredients may be too effective or too potent in some applications to have practical utility. For example, for most effective protection, it is preferred to apply the materials in intimate contact but thoroughly dispersed on the surface to be protected. Therefore, the active ingredients have incorporated therewith a relatively inert surface-active agent or adjuvant as a dispersing medium. Furthermore, such adjuvants have the effect of requiring only minute quantities of said ingredients of some formulations to obtain effective protection. A further advantage of so extending this material is to permit field application by methods readily employed and still obtain effectively complete coverage of the material being protected.

Thus, the formulations of this invention comprise the above defined active ingredients and a suitable material as an adjuvant therefor. The important feature of the invention is to provide an adjuvant such that upon the preparation of a formulation of a concentration appropriate for any particular application, the adjuvant will be present to provide the proper type of contact with the material being protected. Thus, in one embodiment the adjuvant can comprise a surface-active agent such as a detergent, a soap, or other wetting agent. Such a formulation then comprises the active ingredient in combination with a minor proportion of the surface-active agent or adjuvant. Such a formulation is of practical merit because of its concentrated form and ease of transportation, storage, and the like. Such a formulation lends itself directly to further dilution with a diluent or carrier without resorting to complicated mixing and blending procedures. Thus, such a formulation can be further diluted with a solid carrier of the dust type by a simple mixing operation. Likewise, such a formulation can be directly suspended in water or can be further diluted with an oil which upon mixing with water thereby forms an oil-in-water emulsion containing the active ingredient. One further example of the utility of such a formulation comprises the preparation by further dilution with a solid carrier of a wettable powder which upon admixture with water prior to application forms a dispersion of the active ingredient and the solid carrier in water.

In the preparation of the above-described concentrates, the active ingredient may comprise up to about 95% of the concentrated formulation. To obtain 100 parts of a ready to use liquid formulation, from 1 to 50 parts of a concentrate is admixed with from 50 to 99 parts of a diluent or carrier. Although it is not intended that this invention be limited to any specific proportions of active ingredient and adjuvant, it should be noted that ready to use liquid formulations comprising from about 0.001 to 5% of the active ingredient based upon the weight of the formulation are preferred. In such liquid formulations it is also preferred that the adjuvant comprise less than about 5% based upon the weight of the formulation. With ready to use solid formulations, the parts of concentrate and diluent or carrier are substantially the same as defined for the liquids. However, in such solid formulations, the use of from about 2.5 to 25% of the active ingredient based upon the weight of the formulation is preferred. The percentage of adjuvant preferred in the solids is substantially the same as in the liquid formulations.

It is also intended that the term "adjuvant" includes solid carriers of the type of pyrophyllite, talc, clay diatomaceous earth, and the like; and various mineral powders, such as calcium sulfate and the like, which act as a dispersant, as a carrier, and in some instances perform the function of a surface-active agent.

Another method of applying these insecticides is in the form of a water suspension. However, to obtain an active aqueous suspension, there should be employed a surface-active agent in sufficient amount to disperse and suspend the active ingredient. Examples of such surface-active agents which can be employed in forming dispersions include the soft or hard sodium or potassium soaps, tall oil, salts of the alkyl and alkylaryl sulfonates; alkyl sulfates; alkylamide sulfonates, including fatty methyl taurides; the alkylaryl polyether alcohols; the fatty acid esters of polyhydric alcohols; the ethylene oxide addition products of such esters; and the addition products of long-chain mercaptans and ethylene oxide. Still other surface-active agents can be employed, the above merely showing a representative list of the more common materials.

It should be pointed out that the formulations of this invention may also include sticking or adhesive agents, indicators and other active biocidal ingredients. Such other ingredients may be supplementary insecticides, fungicides, bacteriocides, nematocides or selective herbicides.

While the invention has been specifically described with regard to several embodiments, it is not thereby limited, and it is to be understood that modifications and variations thereof obvious to those skilled in the art may be made without departing from the spirit or scope of the invention.

What is claimed is:
1. A compound of the formula

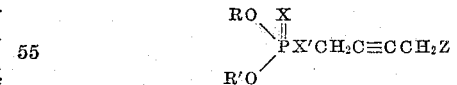

where R and R' are selected from the group consisting of lower alkyl and alkoxy substituted lower alkyl radicals, X and X' are selected from oxygen and sulfur, and Z is selected from the group consisting of cyano, thiocyano, phthalimido, succinimido, benzothiazo, saccharinyl, OR", SR",

where R" is selected from alkyl and alkenyl radicals having 1 to 8 carbon atoms and phenyl radicals.

2. A compound of the formula

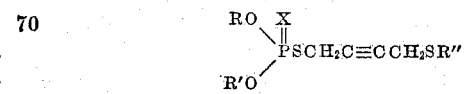

where R and R' are lower alkyl radicals, X is selected from oxygen and sulfur, and R" is selected from alkyl and alkenyl radicals having 1 to 8 carbon atoms and phenyl radicals.

3. O,O-diethyl S-(p-chlorophenyl)thio-2-butynyl phosphorothiolate.

4. O,O-diethyl S-(4-ethylthio)-2-butynyl phosphorothiolate.

5. O,O-diethyl S-(4-ethylthio)-2-butynyl phosphorodithioate.

6. O,O-diethyl S-(4-methoxy-2-butynyl) phosphorodithioate.

7. O,O-diethyl S-(4-thiocyanato-2-butynyl) phosphorothiolate.

8. O,O-diethyl S-(4-allylthio)-2-butynyl phosphorodithioate.

9. O,O - dimethoxyethyl S-(4-thiocyanato-2-butynyl) phosphorothiolate.

10. An insecticidal formulation comprising an insecticidal adjuvant and as an essential active ingredient thereof a compound of the formula

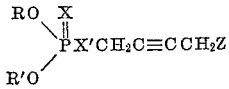

where R and R' are selected from the group consisting of lower alkyl and alkoxy substituted lower alkyl radicals, X and X' are selected from oxygen and sulfur, and Z is selected from the group consisting of cyano, thiocyano, phthalimido, succinimido, benzothiazo, saccharinyl, OR", SR",

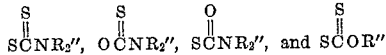

where R" is selected from alkyl and alkenyl radicals having 1 to 8 carbon atoms and phenyl radicals.

11. An insecticidal formulation comprising an insecticidal adjuvant and as an essential active ingredient thereof a compound of the formula

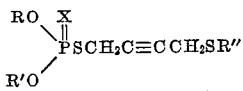

where R and R' are lower alkyl radicals, X is selected from oxygen and sulfur, and R" is selected from alkyl and alkenyl radicals having from 1 to 8 carbon atoms and phenyl radicals.

12. A method of combatting insects which comprises treating the insects externally and the insect habitats with a composition containing as an essential active ingredient thereof a compound of the formula

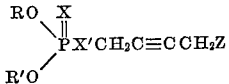

where R and R' are selected from the group consisting of lower alkyl and alkoxy substituted lower alkyl radicals, X and X' are selected from oxygen and sulfur, and Z is selected from the group consisting of cyano, thiocyano, phthalimido, succinimido, benzothiazo, saccharinyl, OR", SR",

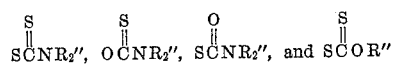

where R" is selected from alkyl and alkenyl radicals having 1 to 8 carbon atoms and phenyl radicals.

13. A method of combatting insects which comprises treating the insects externally and the insect habitats with a composition containing as an essential active ingredient thereof a compound of the formula

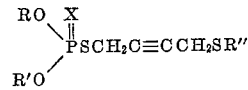

where R and R' are lower alkyl radicals, X is selected from oxygen and sulfur, and R" is selected from alkyl and alkenyl radicals having 1 to 8 carbon atoms and phenyl radicals.

14. A method of protecting plants from insects which comprises treating the plant with a composition containing as an essential active ingredient a compound of the formula

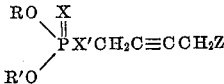

where R and R' are selected from the group consisting of lower alkyl and alkoxy substituted lower alkyl radicals, X and X' are selected from oxygen and sulfur, and Z is selected from the group consisting of cyano, thiocyano, phthalimido, succinimido, benzothiazo, saccharinyl, OR", SR",

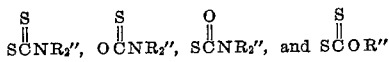

where R" is selected from alkyl and alkenyl radicals having 1 to 8 carbon atoms and phenyl radicals.

15. A method of protecting plants from insects which comprises treating the plant with a composition containing as an essential active ingredient a compound of the formula

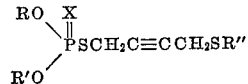

where R and R' are lower alkyl radicals, X is selected from oxygen and sulfur, and R" is selected from alkyl and alkenyl radicals having from 1 to 8 carbon atoms and phenyl radicals.

No references cited.